United States Patent [19]

Bibbero

[11] 4,232,364

[45] Nov. 4, 1980

[54] ADAPTIVE SAMPLED-DATA CONTROLLER

[75] Inventor: Robert J. Bibbero, Merion Station, Pa.

[73] Assignee: Honeywell Inc., Minneapolis, Minn.

[21] Appl. No.: 970,738

[22] Filed: Dec. 18, 1978

[51] Int. Cl.³ .................. G05B 13/02; G05B 21/02
[52] U.S. Cl. ........................... 364/105; 318/561; 318/636; 364/111; 364/121
[58] Field of Search ............... 364/105, 106, 121, 111, 364/112, 119, 552, 554; 318/636, 561, 562

[56] References Cited

U.S. PATENT DOCUMENTS

| 3,569,681 | 3/1971 | Koepcke | 364/121 X |
| 3,622,767 | 11/1971 | Koepcke | 318/636 X |
| 3,671,727 | 6/1972 | Rhoades | 318/561 |
| 3,781,533 | 12/1973 | Barnstone et al. | 364/105 |
| 3,940,600 | 2/1976 | Alexander et al. | 364/121 X |

Primary Examiner—Joseph F. Ruggiero
Attorney, Agent, or Firm—L. J. Marhoefer

[57] ABSTRACT

A digital controller has a plurality of separate control algorithms stored in its memory. A set point value and a process variable value are each continually sampled. Each sample is compared to the previous sample and one of the plurality of separate control algorithms is chosen based on stored criteria and the differences between the sampled and stored values.

8 Claims, 6 Drawing Figures

ADAPTIVE SAMPLED-DATA CONTROLLER

BACKGROUND OF THE INVENTION

1. Field of the Invention

This invention relates to an improved method and apparatus for controlling a process parameter and more particularly to a method and apparatus in which one of several stored control algorithms is selected for use in controlling the parameter.

2. Description of the Prior Art

In controlling industrial processes, significant losses may result from inability to maintain process parameters such as flow, temperature, and concentration, at their most efficient or optimum value. In monetary terms, these losses have been estimated as from more than 5% to over 12% of the total product value. In addition, excessive fluctuation of variables may lead to early wearout or failure of equipment, requiring costly shutdowns.

A large portion of these losses are due to a less-than-ideal match of a process controller with the process dynamics and with the nature of a disturbance or change in process parameter. For a closed-loop response of a process to be optimum in some sense (say minimum time and distance from the target value), the controller dynamics should be designed to suit both the plant and the disturbance.

The most common prior art approach to this problem is the employment of an "average" or "compromise" controller algorithm such as the so-called three-term or proportional-integral-differential (PID) algorithm. This algorithm can be "tuned" to suit a particular process and a particular signal-noise environment by adjusting the gain parameters of the proportional, integral and differential elements combining to produce the output signal for controlling the process. Tuning is accomplished by somewhat empirical methods.

Since the tuning of a conventional controller is a compromise solution, it seldom, if ever, yields ideal performance and leads to much of the losses cited above.

Another approach is to use the so-called "self-tuning" or continuously adaptive controller. This senses changes in the closed-loop dynamics and adjusts some non-linear element in the controller to return the response to a more nearly ideal state.

This type of controller algorithm works well when there are relatively slow changes in dynamics caused by environmental changes or drift. However, it is unsuited to respond to rapid changes in disturbance. Also, adaptive algorithms tend to be quite complex and/or to require the injection of extraneous disturbances at intervals, neither of which is desired in industrial process control.

SUMMARY OF THE INVENTION

The purpose of this invention is, therefore, to provide means whereby controller dynamics suitable to the disturbance can be automatically selected and employed.

Briefly, in this invention, it is possible to take advantage of the ability of a digital controller, such as a general purpose microprocessor, to be programmed for a large number of algorithms, each of which may be stored in a Read-Only Memory (ROM) and called upon when desired. It is possible to provide, for example, 6 algorithms which may be of the minimal-prototype form or any other suitable modification, but each provides an optimum response to a particular form of disturbance input, set point, or load variable step, ramp and acceleration.

It is possible to evaluate the type of disturbance on the basis of preestablished criteria and use this evaluation to select an algorithm to control the loop.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
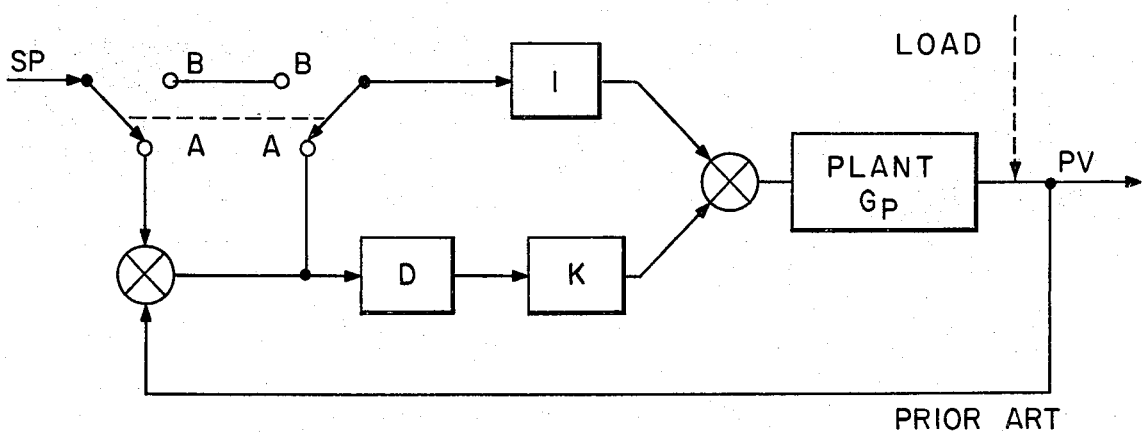
FIG. 1 is a schematic block diagram of a process control loop having so-called "A" and "B" equation modes of operation.

A prior art modification of the PID controller, which partially alters the controller response as a function of disturbance, is the so-called A-B equation controller illustrated in FIG. 1. When the switches are set in the "A" equation mode the behavior is that of the normal PID. In particular, either a set point change or load change (affecting the process variable (PV) feedback) will be acted upon by all three elements of the controller; differential (D), gain (K) and integral (I). However, in the "B" position, the controller acts differently depending on whether the PV signal changes and the "SP" is held constant or vice versa. If the PV (load) signal is active, the controller dynamics include the "D" and "K" elements, hence the response is rapid. But if the "SP" changes and not PV, response is only through the integral (I). Thus, the response is slow and gradual. If, for example, the SP change is rapid, approaching a step function, the controller output is changed to a gradually increasing ramp signal. This protects the process against sudden changes or "bumps" which might be inadvertently caused by manual control.

The A-B equation controller is a partial but not complete solution to the problem of controller dynamics matching.

In conventional analog process controllers, the designer is limited to essentially "linear" solutions to the dynamic problem, of which the PID algorithm is one. But, if digital processors are employed as controllers in a sampled-data control system, it is feasible to implement many non-linear solutions which may give performance impossible to achieve with linear systems.

Figure 2:
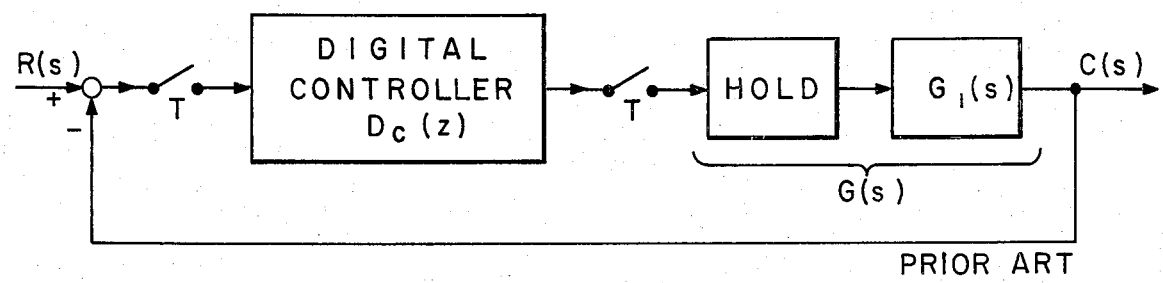
FIG. 2 is a schematic block diagram of a conventional prior art sample and hold process control loop.

For example, assume a single closed-loop system controlled by a digital controller $D_c(z)$, illustrated in FIG. 2. The process is represented by the block $G_1(s)$ and may be a chemical reactor, for example, where the product composition is the controlled variable C (s). The switches symbolize a sampled-data system, necessitated by the digital controller, with a sampling interval T. The block labeled "Hold" is a zero-order hold, also known as a box-car circuit, which maintains the last value of the controller output, and is considered part of the process transfer function.

The closed-loop transfer function in terms of the z-transform is:

$$T(z) = \frac{C(z)}{R(z)} = \frac{Dc(z)\, G(z)}{1 + Dc(z)\, G(z)}$$

or $$Dc(z) = \frac{Td(z)}{G(z)\,[1 - Td(z)]}$$

Within limits of physical realizability, namely, the use only of present and past sample inputs to achieve a sample output, the desired closed-loop transfer function Td (z) or response to a given input R (s) can be specified at will and a controller Dc (z) calculated to meet the requirement. The criteria for Td (z) may be any of those commonly-used, such as overshoot, time to first peak, and various intergral-error criteria.

One family of Td (z) functions particularly suited to this invention are those called minimal-prototype. The response of the minimal-prototype is called "deadbeat", that is, in general, it reaches the desired state with minimum practical delay and stops there without overshoot. The form of the minimal-prototype controller or algorithm depends on the input disturbance, whether it is a step function, ramp, or an acceleration input. Furthermore, its form depends on whether the set point or the load (PV) is to be held constant, e.g., if it is a controller or a regulator. For a given process, then, there are 6 minimal-prototype algorithms.

Figure 3:
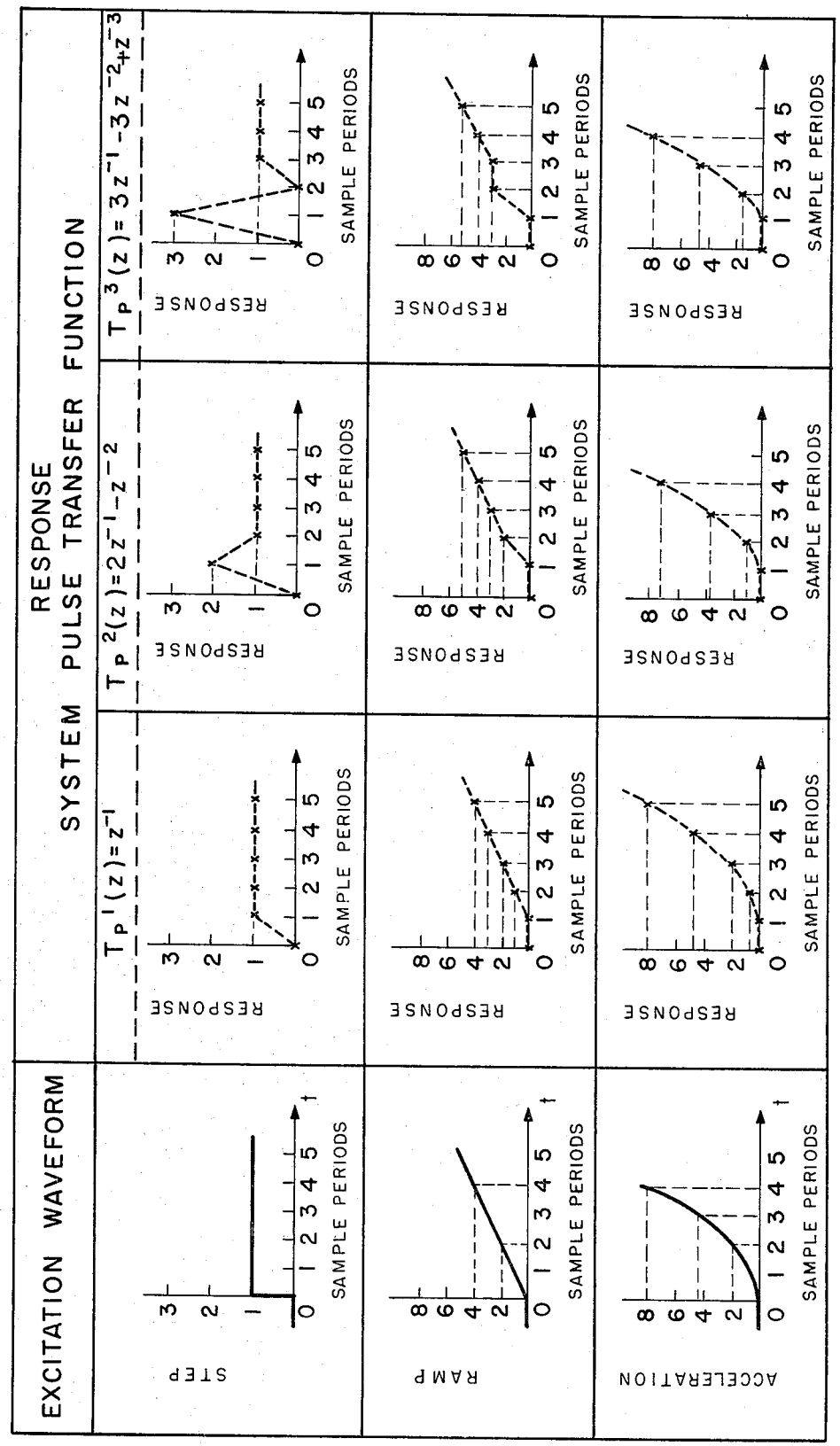
FIG. 3 is a chart illustrating the response of minimal-prototype systems to various excitation wareforms.

FIG. 3 shows the performance of three of these algorithms (for a controller or set point change), the step function, which has a system transfer function $Tp^1(z) = z^{-1}$; ramp input, $Tp^2(z) = 2z^{-1} - z^{-2}$; and the acceleration input, $Tp^3(z) = 3z^{-1} - 3z^{-2} + z^{-3}$. It can be noted that each system transfer function gives the best response for its own type of disturbance, i.e., all the graphs on the diagonal, but for none other. For example, the step transfer function ($Tp^1(z) = z^{-1}$) gives a one period delay - no overshoot-response to a step disturbance, but lags behind for ramp and acceleration. Likewise, the ramp and acceleration inputs show excessive overshoot when applied to the step transfer function. In general, a kth order minimal-prototype (designed for $Tp^k$) has a settling time of k sampling periods and zero steady-state error for singularities $U_{-n}(t)$ where $n \leq k$ and the symbol n or k is 1 for a step, 2 for ramp, and 3 for acceleration inputs. For $n > k$ the steady state error is greater than zero; for $n < k$ the response has excessive overshoot.

Minimal-prototype systems $Tp^k(z)$ can be modified to yield a function $Tp^k(z)/(1 - Cz^{-1})$ where C is called the staleness factor and can be adjusted to trade off speed of response for less critical tuning. Also, the modifications to the design procedure can be accomplished, by well-known means, to insure ripple-free behavior of the controller output between sampling instants since the z-transform function are only defined at these instants.

Figure 4:
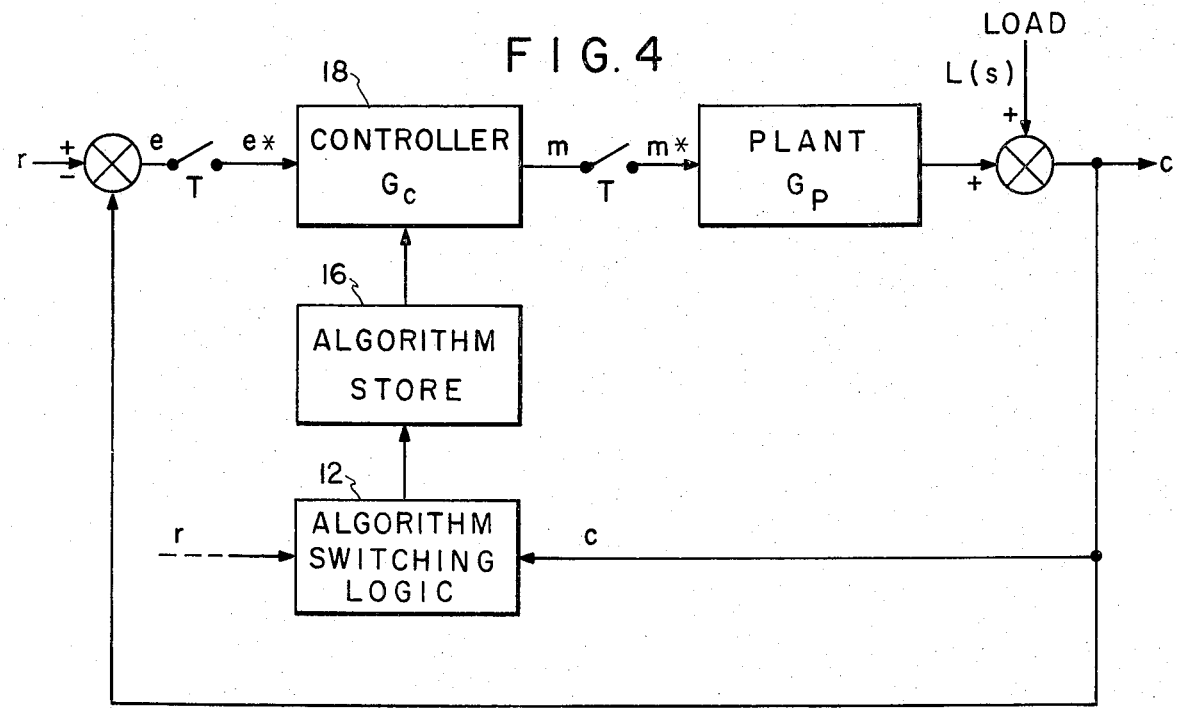
FIG. 4 is a block diagram of a process control system in accordance with the teachings of this invention.
Figure 5:
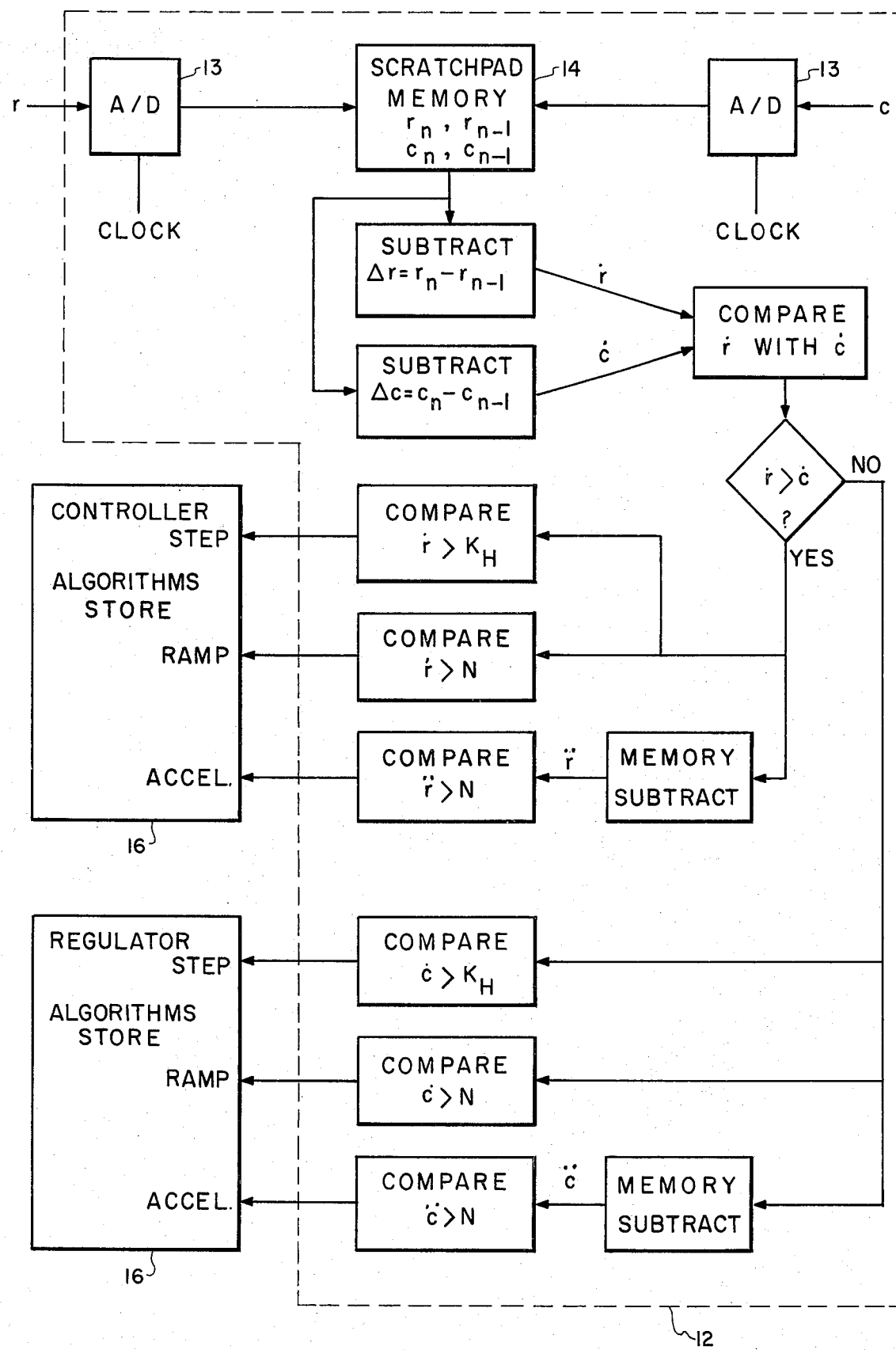
FIG. 5 is a partial block diagram and flow chart illustrating the method for evaluating the type of a disturbance in accordance with the teachings of this invention.

The general scheme of this invention is shown in the block diagram of FIG. 5. A block labeled "switching logic" contains logic circuitry (in FIG. 4 and shown dotted in FIG. 5) detects one of the six kinds of disturbances and selects an appropriate algorithm for control of the loop.

Analog signals proportional to the set point r and process variable or closed-loop output c are the inputs to the circuit 12. These signals are sampled at regular intervals (T) determined by a clock pulse and converted to digital values by A/D converters 13. They are then stored in a temporary memory or register 14.

By subtracting the previous from the most recent digital values, a difference value $\Delta r$ or $\Delta c$ is obtained. Since the sample intervals are constant, the difference signals will be proportional to the rate of change or velocity of the set point and PV. The two rates are compared and the greater determines the general type of algorithm. That is, if the set point rate $\dot{r}$ is greater than the PV rate $\dot{c}$, the disturbance is deemed a set point change and the selection channel switches to controller algorithms. If the opposite pertains, a regulator algorithm is to be selected.

The rates are then compared with other criteria to select the correct algorithm. If $\dot{r}$ exceeds a specified high threshold $K_H$ (which will be deemed appropriate to the process), the set point disturbance can be deemed a step function. Thus, the $Tp^1(z)$ response is desired and the appropriate controller algorithm (which may be a minimal-prototype as specified above) can be selected. If r is below $K_H$ but greater than N, a noise threshold (usually near zero), the input is deemed a ramp and a controller ramp algorithm selected. Finally, two successive values of $\dot{r}$ (or $\dot{c}$) are compared and $\ddot{r}$, the rate of change of setpoint velocity, exceeds the noise threshold, the signal is deemed on acceleration input and the controller acceleration algorithm is chosen.

Identical circuits act on the $\dot{c}$ signal if that is the larger disturbance and select one of three regulator algorithms.

The output of the algorithm switching logic 12 selects one of six algorithms stored in the algorithm store 16. This algorithm which conveniently may be stored in a Read-Only memory (ROM) establishes the operating mode of the microprocessor controller 18. Once an algorithm has been selected the overall operation of the control loop is the same in conventional prior art control logs.

Figure 6:
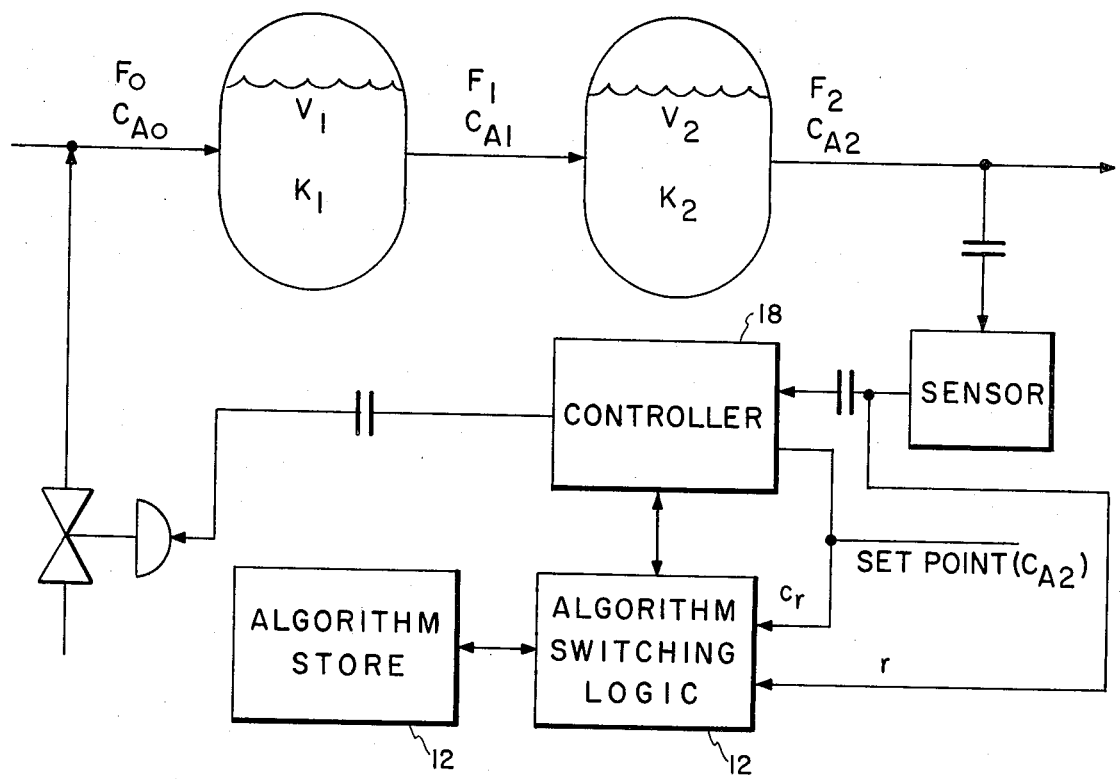
FIG. 6 is a block diagram of a process controlled in accordance with the teachings of this invention.

As an example of how a minimal-prototype algorithm is obtained, consider again a closed-loop digital control system of a common type of continuously-stirred chemical reactor as shown in FIG. 6. This consists of two tanks of volume Vn through which flow a reactant A with flow rates Fn and concentration C. In each tank a reaction takes place causing loss of A with a specific reaction rate $K_n$. This ubiquitous system can be represented by a Laplace transfer function of the form $$G_1(s) = \frac{K_p}{(\tau_{p1}s + 1)(\tau_{p2}s + 1)}$$

Many common processes can thus be represented by two time lags. As earlier stated, for a desired closed-loop transfer function Td (z) the controller transfer function is $$Dc(z) = \frac{Td(z)}{G(z)\,[1 - Td(z)]} \qquad \text{(Eq. 1)}$$

Alternately, Dc (z) can be represented by a ratio of polynominals in z:

$$D_c(z) = \frac{a_m z^m + a_{m-1} z^{m-1} + \ldots + a_0}{B_n z^n + b_{n-1} z^{n-1} + \ldots + b_0} \quad \text{(Eq. 2)}$$

where, to be physically realizable, $m \leq n$.

The desired loop transfer function Td (z) for a step function input is the input delayed by one sample period, and as stated is equal to 1/z. Then let $$G_1(s) = \frac{1}{(s+1)(s+2)}$$

for example, and if a zero-order hold is used $(1-e^{-sT})$, then:

$$G(z) = z \left\{ (1 - e^{-sT}) \frac{1}{s(s+1)(s+2)} \right\}$$

$$= \frac{z-1}{z} \left\{ \frac{z/2}{z-1} - \frac{z}{z-e^{-T}} + \frac{z/2}{z-e^{-2T}} \right\}$$

Letting $e^{-T} = \frac{1}{2}$ and $e^{-2T} = \frac{1}{4}$ $$G(z) = \frac{(\frac{1}{8})(z + \frac{1}{2})}{(z-1)(z-\frac{1}{4})}$$

If Td (z) is chosen to be 1/z, then, from Equation (1), Dc (z) is given by $$D_c(z) = \frac{8(z - \frac{1}{2})(z - \frac{1}{4})}{(z + \frac{1}{2})(z - 1)} \quad \text{Eq. (3)}$$

Equation 3 is realizable because the denominator and numerator polynomials are of the same degree.

We can now design a digital computer to realize Dc (z) by writing the difference equation associated with Equation 3
Since Dc $(z) = X_2(z)/X_1(z)$, $$(1 - (\tfrac{1}{4})z^{-1} - (\tfrac{1}{2})z^{-2})X_2(z) = (8 - 6Z^{-1} + z^{-2})X_1(z)$$
Eq. (4)

from which $$X_2(n) = (\tfrac{1}{4})x_2(n-1) - = (\tfrac{1}{2})x_2(n-2) + 8x_1(n) - 6x_1(n-1) + X_1(n-2)$$

A digital computer programmed to implement Equation (4) would be implemented in the controller of FIG. 6 whenever the selector circuit of FIG. 5 determined there was a step set point input.

In the practical implementation of this invention it is generally accepted that the majority of industrial processes under control can be approximated by first or second order plant transfer functions with dead time:

$$G_p(s) = \frac{K_p e^{-\tau D_s}}{(\tau_1 + 1)(\tau_1 + 2)} \text{ or } \frac{K_p e^{-\tau D_s}}{(\tau + 1)} \quad (5)$$

where Kp is the process gain, $\tau_D$ is the dead time in terms of the sampling interval $(\tau_D = nT)$, and $\tau_1, \tau_2$, the lag constants.

It has been found by using this model for solutions of equations of the type (1) to (4) and by computer simulation studies that for the minimal-prototype set point algorithm and step function, the controller equation $D_c(Z)$ becomes:

$$m = b_0[e_i + b_1 e_{i-1} + b_2 e_{i-2} + a_1 m_{i-1-n} + a_2 m_{i-2-n}] \quad (6)$$

where m is the controller output (valve signal) $e_{i-k}$ and $m_{i-k}$ are the error and output values K periods in the past, and n = d/T. The values for the constants b, and $b_2$ calculated as follows.

$$\alpha = \exp(-T/\tau_1); \beta = \exp(T/\tau_2) \quad (7)$$
$$b_1 = -(\alpha + \beta); b_2 = \alpha\beta$$

$$a_1 = K_p \left[ 1 + \frac{\alpha\tau_1 - \beta\tau_2}{\tau_1 - \tau_2} \right]$$

As another example that has been found is that the regulator algorithm for a first order process with dead time and a step input in the case where $\tau d = T$, is:

$$m = b_1 e_{i-1} + b_2 e_{i-2} - a_1 m_{i-1} - a_2 m_{i-2} - a_3 m_{i-3} \quad (8)$$
where $b_1 = (1 - e^{-4aT})/K_p(1 - e^{-aT})^2$
$b_2 = (e^{-4aT})/K_p(1 - e^{-aT})^2$
$a_1 = e^{-aT}$
$a_2 = e^{-2aT}$
$a_3 = (-1 + e^{-aT} + e^{-3aT} - e^{-4aT})/(1/-e^{aT})^2$
and
$$a = 1/\tau \quad (9)$$

These algorithms or modifications using the staleness factor $1/(1-cz^{-1})$ or other similar algorithms can be supplemented by equivalent algorithms designed for the ramp and acceleration functions by the methods described above, cast into difference equation form, and implemented as digital controller algorithms in ROM form so they may be selected by the circuitry described above.

In general, digital controller algorithms can be designed that are superior to the PID algorithm or its variants from the viewpoint of response speed and overshoot or the various error criteria dependent on them. However, in the present state-of-the-art, these algorithms must be deeply compromised or are of limited use because they are suitable only for one type of disturbance and give poor performance for other disturbances.

The embodiments of the invention in which an exclusive property or privilege is claimed are defined as follows:

1. In a loop for controlling a parameter of a process variable in which a controller compares the parameters with a set point value and produces an output control signal proportional to the difference between the parameter and the set point, the improvement comprising:
   a digital controller;
   a digital memory having stored therein a plurality of separate control algorithms;
   means for continuously sampling the value of the set point at predetermined intervals;
   means coupled to said sampling means for storing the sample set point values;
   means coupled to said storing means for adding each sample value to a previous sampled value in order to obtain an algebraic difference between said stored values;
   means coupled to said adding means for comparing said algebraic difference with predetermined criteria, said comparing means producing a characteristic output when said algebraic difference meets said criteria;

means coupled to said comparing means for selecting one of said stored algorithms and for coupling said algorithm to said digital controller to govern the operation thereof.

2. In a loop for controlling a parameter of a process variable in which a controller compares the parameters with a set point value and produces an output control signal proportional to the difference between the parameter and the set point as in claim 1, further comprising:

means for continously sampling the value of the process parameter at predetermined intervals;

means coupled to said last named sampling means for storing the sample process variable values;

means coupled to said process variable storing means for adding each process variable sample value to previous process variable sampled value in order to obtain an algebraic difference between said stored values;

means coupled to said last named adding means for comparing said algebraic difference with predetermined criteria, said comparing means producing a characteristic output when said algebraic difference meets said criteria;

means coupled to said last name comparing means for selecting one of said stored algorithms and for coupling said algorithms to said digital controller to govern the operation thereof.

3. In a loop for controlling a parameter of a process varible in which a controller compares the parameters with a set point value and produces an output control signal proportional to the difference between the parameter and the set point, as in claim 1 wherein:

said plurality of separate control algorithms are minimal prototype algorithms.

4. In a loop for controlling a parameter of a process variable in which a controller compares the parameters with a setpoint value and produces an output control signal proportional to the difference between the parameter and the setpoint, as in claim 2 wherein;

said plurality of separate control algorithms are minimal prototype algorithms.

5. In a loop for controlling a parameter of a process variable in which a controller compares the parameters with a setpoint value and produces an output control signal proportional to the difference between the parameter and the setpoint, as in claim 1 wherein:

said predetermined criteria distinguish between step function changes in the value of the setpoint, ramp function changes the values of the setpoint signal, and acceleration function changes in the value of the setpoint signal.

6. In a loop for controlling a parameter of a process variable in which a controller compares the parameters with a setpoint value and produces an output control signal proportional to the difference between the parameter and the setpoint, as in claim 5, wherein:

said plurality of separate control algorithms are minimal prototype algorithms.

7. A method for controlling a parameter of a process variable in which a controller compares the parameters with a setpoint value and produces an output controller signal proportional to the difference between the parameters and the setpoint, including the steps of:

sampling the value of the setpoint at predetermined intervals;

storing the sample setpoint values;

adding each sample value to a previously sampled value in order to obtain an algebraic difference therebetween;

comparing said algebraic difference with a predetermined criteria; and selecting one of a plurality of stored algorithms for use by the controller on the basis of the result of the step in which the algebraic difference was compared with the predetermined criteria.

8. A method for controlling a parameter of a process variable in which a controller compares the parameters with a setpoint value and produces an output controller signal proportional to the difference between the parameters and the setpoint including the steps of:

sampling the value of the setpoint at predetermined intervals;

sampling the value of the process variable at predetermined intervals;

storing the sampled setpoint values;

adding each sample setpoint value to a previously sampled setpoint value in order to determine an algebraic difference therebetween;

adding each sample process variable value to a previous process variable value in order to obtain an algebraic difference therebetween;

comparing the algebraic difference between with setpoint values and the process variable values;

selecting the larger of the algebraic differences and comparing said larger algebraic difference with a predetermined criteria; and selecting one of a plurality of stored algorithms for use by the controller on the basis of the result of the step in which the algebraic difference was compared with the predetermined criteria.

* * * * *